United States Patent [19]
Wenger

[11] 3,752,298
[45] Aug. 14, 1973

[54] FOOD CONVEYOR CONSTRUCTION

[75] Inventor: Carl D. Wenger, Orrville, Ohio

[73] Assignee: The Biro Manufacturing Company, Marblehead, Ottawa, Ohio

[22] Filed: Dec. 16, 1971

[21] Appl. No.: 208,757

[52] U.S. Cl............................. 198/204, 198/126
[51] Int. Cl............................................ B65g 15/60
[58] Field of Search........................... 198/204, 233

[56] References Cited
UNITED STATES PATENTS

| | | | |
|---|---|---|---|
| 3,474,893 | 10/1969 | Morine | 198/204 X |
| 1,488,858 | 4/1924 | Arndt | 198/233 X |
| 3,120,303 | 2/1964 | Leonard | 198/204 |
| 3,389,780 | 6/1968 | Jerome | 198/233 X |
| 3,581,878 | 6/1971 | Jacobson | 198/204 |

*Primary Examiner*—Harvey C. Hornsby
*Assistant Examiner*—James W. Miller
*Attorney*—John H. Bishop and Joseph Frease

[57] ABSTRACT

A conveyor having an endless belt for conveying food products such as meat products between meat processing units such as grinders and mixers, which may be cleaned readily with quick dismantling and reassembly of trough sections, pan unit and endless belt, and with complete belt removal, at normally daily intervals as required by government and inspection regulations.

7 Claims, 29 Drawing Figures

PATENTED AUG 14 1973 3,752,298
SHEET 1 OF 4
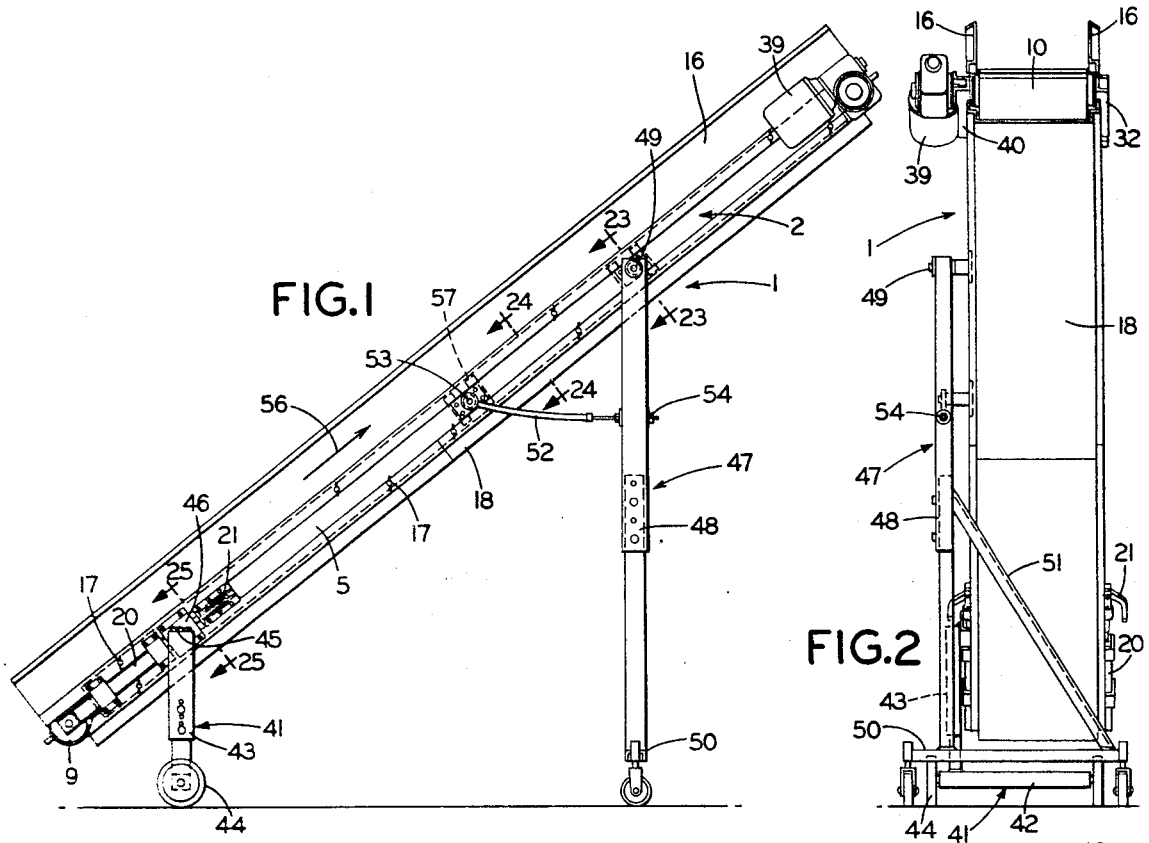
FIG.1
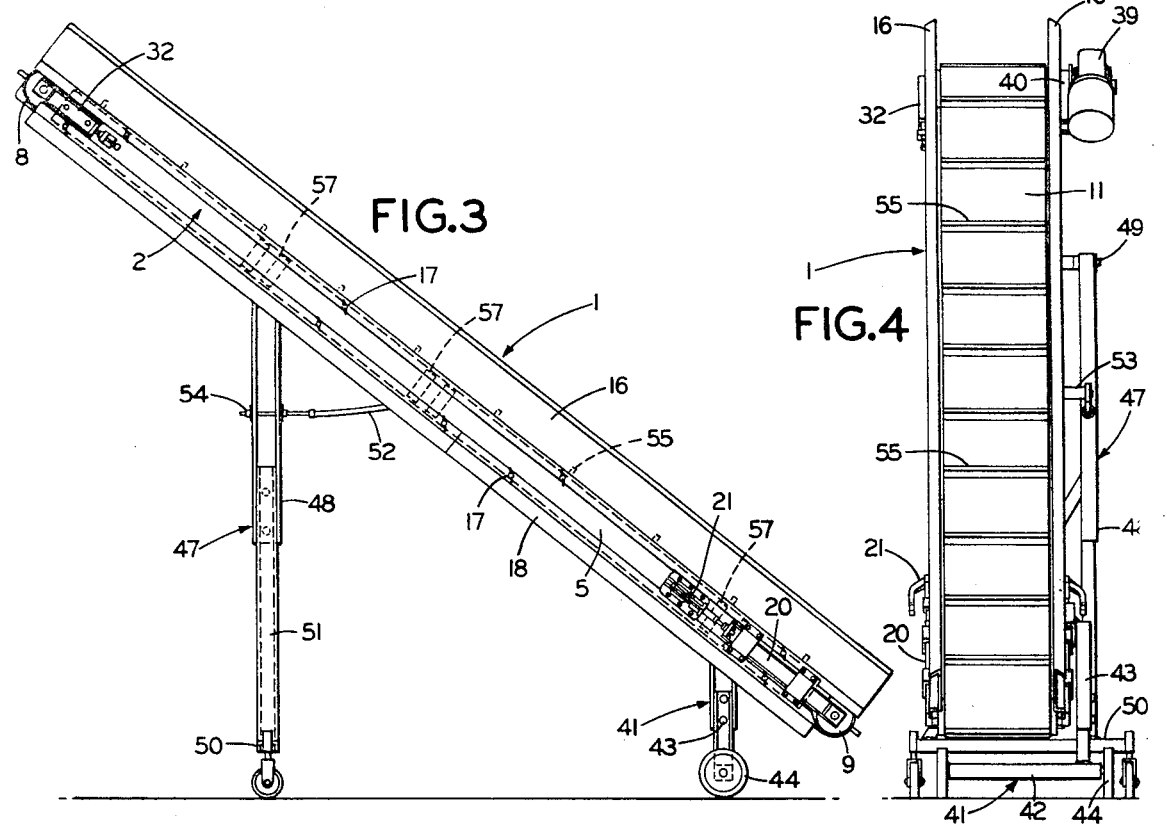
FIG.2
FIG.3
FIG.4

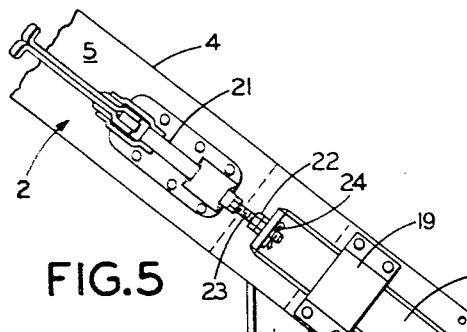
FIG.5
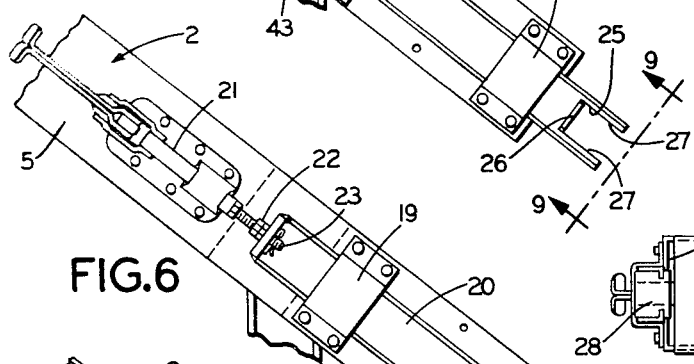
FIG.6
FIG.7
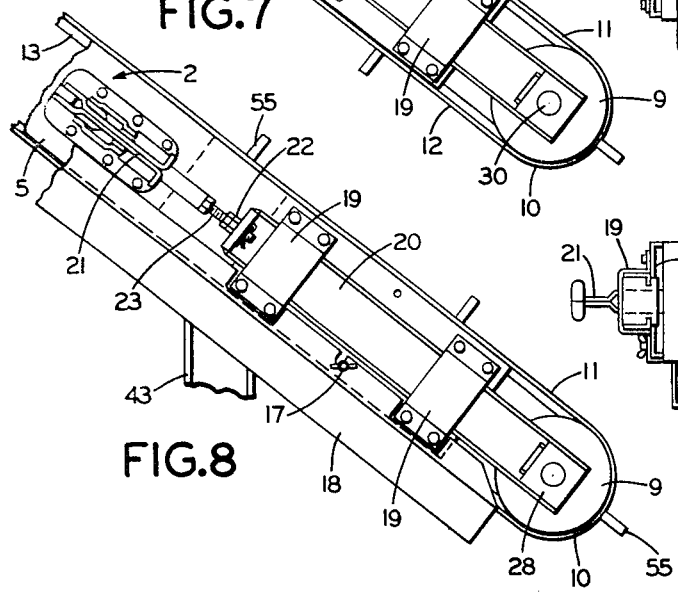
FIG.8
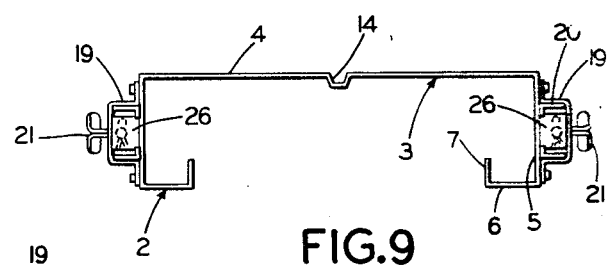
FIG.9
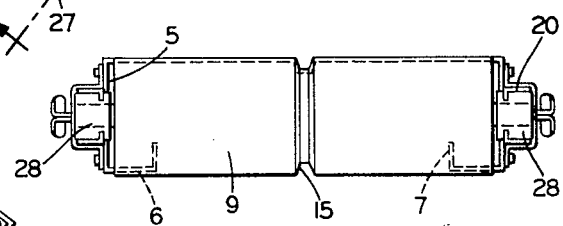
FIG.10
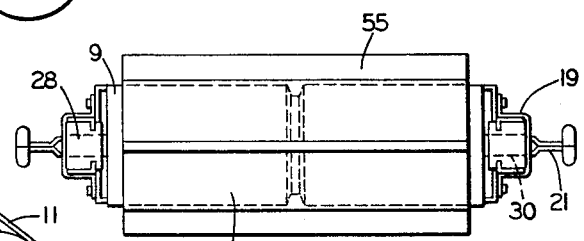
FIG.11
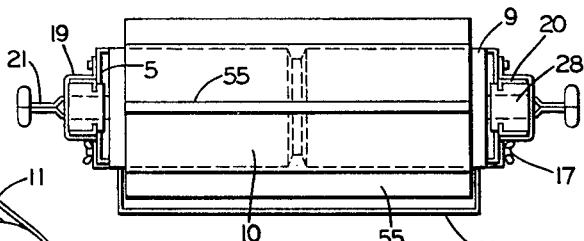
FIG.12

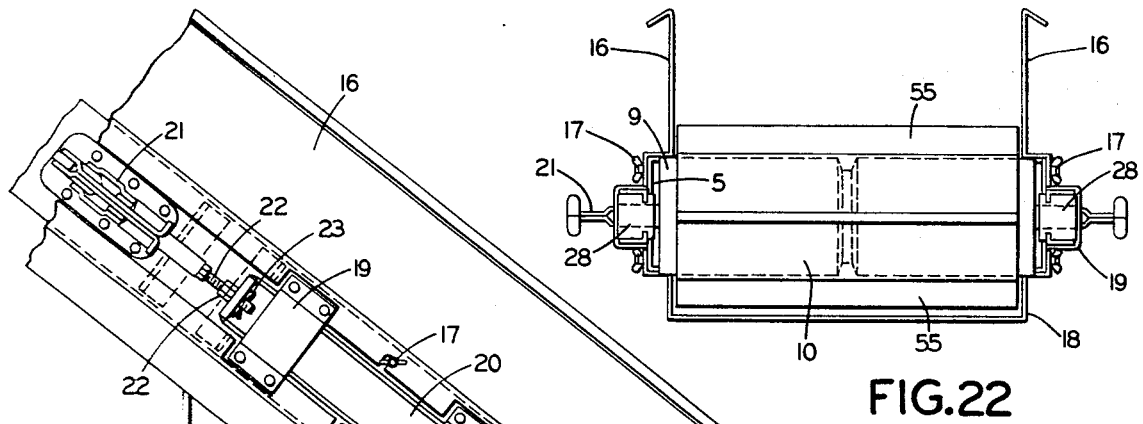
FIG. 21
FIG. 22
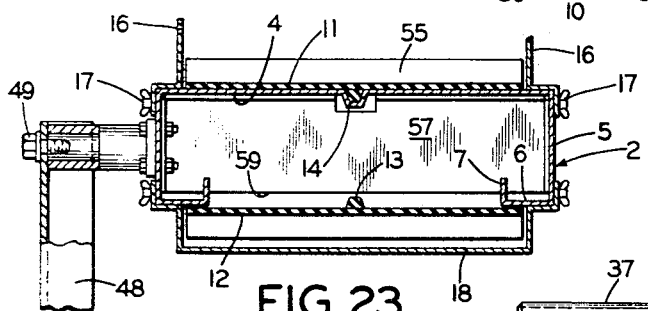
FIG. 23
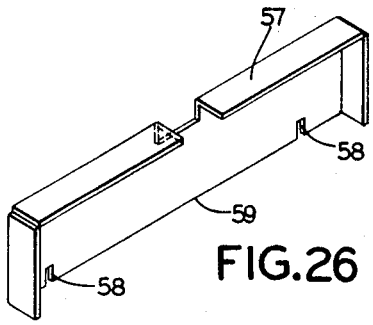
FIG. 26
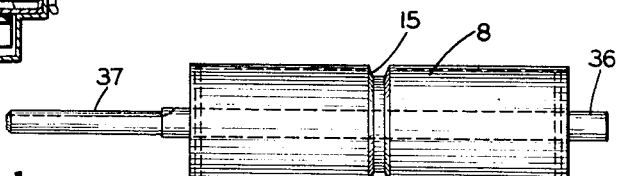
FIG. 27
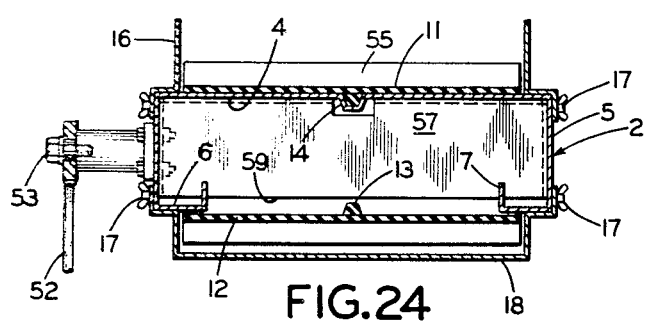
FIG. 24
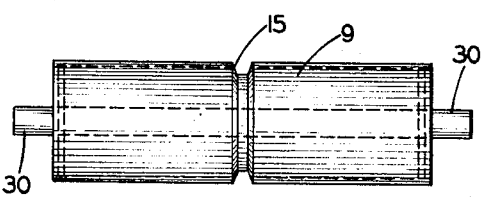
FIG. 28
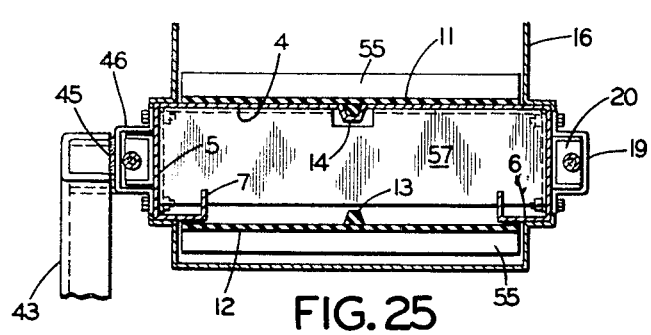
FIG. 25
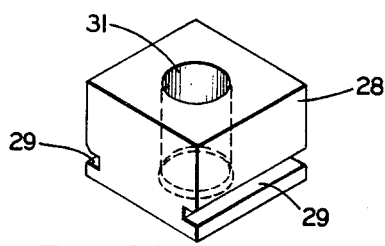
FIG. 29

FOOD CONVEYOR CONSTRUCTION

BACKGROUND OF THE INVENTION

1. Field of the Invention

The invention relates to the food industry and particularly to equipment for processing meat products handled in production lines such as for preparing hamburger and sausage products. In these processing operations the meat in various stages of preparation is delivered by conveyors from grinders to mixers, or by conveyors between various meat processing units. The meat components usually are received at a meat processing plant either frozen or refrigerated as chunks or trimmings in boxes or barrels, from the slaughter house where such raw meat products are produced.

Recent government and inspection regulations have required such conveyors and all their parts to be thoroughly and completely washed and cleaned to provide sanitary conditions at least once a day, when in operation, such as every day at the conclusion of use for that day.

2. Description of the Prior Art

Prior food or meat products conveyors oridinarily have had a trough-like assembly within and around which an endless belt is driven by drive means mounted on the assembly. The main trough and belt support members of the assembly have a pan connected thereto extending below the lower run of the belt. The assembly is mounted on legs locating the conveyor in an angularly upwardly extending position. Normally a short lower leg assembly has been used having two posts, one located at or connected to either side of the trough assembly; and a long upper leg assembly having two adjustable posts, one located at or connected to either side of the trough assembly. The four leg posts support the conveyor in operative position. The leg post assemblies usually have been provided with wheels or casters for readily moving the conveyor to various locations for use.

It is necessary to dismantle the trough assembly each time that the conveyor is to be cleaned with steam, hot water or a selected detergent or cleaning solution. The conveyor components usually are formed of metal, preferably stainless steel and all must be thoroughly cleaned. Similarly the endless belt which is formed of rubber or plastic compositions also must be removed and cleaned. It is not possible with prior devices to completely remove an endless belt from a four-legged support structure unless the belt is laced and the lace pin is removed. Heretofore, an endless belt has been relieved of tension, slipped sideways of its mounting rolls, and threaded down in a loop over and around two legs at one side of the conveyor. Cleaning of such conveyor components looped around legs is difficult, time consuming and expensive.

SUMMARY OF THE INVENTION

Objectives of the invention are to provide a food conveyor supported on legs in a desired position, usually angular, above the floor with a completely removable endless loop belt; to provide an endless loop belt food conveyor construction in which trough-forming components mounted on the belt support platform, a pan beneath the platform, belt rolls at the ends of the platform, and a power driven endless loop belt normally extending above and below the platform and around the rolls and between the platform and pan all may be completely dismantled from the platform while the platform remains mounted in normal position on its leg means for complete separate cleaning of all components of the conveyor; to provide such a construction which may be dismantled in a very short time in a matter of a few minutes, and after complete cleaning with hot water or steam spray with a detergent or cleaning solution may be equally rapidly reassembled; and to provide a new food conveyor construction which eliminates the difficulties heretofore encountered in the use and cleaning of prior devices, which avoids the prior time consuming and costly dismantling and cleaning operations, which achieves the indicated objectives simply, effectively and inexpensively, and which solves problems and satisfies needs existing in the art.

These objectives and advantages are obtained by the construction, the general nature of which may be stated as including, in a food conveyor, a support platform having an inverted channel-shape with a generally flat top, and downwardly and inwardly, longitudinally extending side flange means; belt rolls at the ends of the platform, means removably mounting the rolls for adjustable retraction toward each other on the platform, and slidably mounted block-like bearings journaling the rolls on the roll mounting means; pan means extending in spaced relation below the platform; trough-forming flange means extending upward longitudinally at either side of the flat platform top; quick-release wing-nut means removably mounting the pan means and trough-forming flange means on the platform; an endless belt looped around the rolls with one run extending along and supported by the flat platform top between the trough-forming flange means, and the other run extending between the flat top and pan, below the platform top; power drive means for the belt mounted on the platform, releasably engaging one of the rolls; and leg support means for the platform mounted cantilever-fashion on one platform side flange means at spaced locations thereon, the leg support means being adjustable, and including first and second leg assemblies, and each assembly having a pair of rollers thereon, whereby the legs and rollers stably support the platform.

BRIEF DESCRIPTION OF THE DRAWINGS

A preferred embodiment of the improved conveyor construction — illustrative of the best mode in which applicant has contemplated applying the principles — is set forth in the following description and shown in the drawings, and is particularly and distinctly pointed out and set forth in the appended claims.

FIG. 1 is a left side elevation of the improved food conveyor;

FIG. 2 is a rear end view of the conveyor;

FIG. 3 is a right side elevation of the conveyor;

FIG. 4 is a front end view of the conveyor;

FIGS. 5, 6, 7 and 8 are fragmentary enlarged views of a portion of FIG. 3 illustrating steps in the reassembly of a dismantled conveyor;

FIGS. 9, 10, 11 and 12 are end views respectively, of the parts shown in FIGS. 5, 6, 7 and 8, looking as indicated by the arrows 9—9, FIG. 5;

FIG. 21 is a view similar to FIGS. 5-8 of the completely reassembled conveyor ready for use;

FIG. 22 is an end view of the parts shown in FIG. 21;

FIGS. 23, 24 and 25 are enlarged sectional views taken respectively, on the lines 23—23, 24—24 and 25—25, FIG. 1;

FIG. 26 is a perspective view of one of the platform braces;

FIGS. 27 and 28 are side views of the upper and lower rolls; and

FIG. 29 is a perspective view of one of the roll bearing blocks.

Similar numerals refer to similar parts throughout the drawings.

DESCRIPTION OF THE PREFERRED EMBODIMENT

Figure 17:
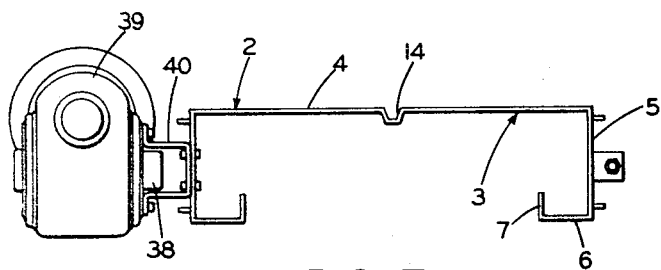
FIGS. 17, 18, 19 and 20 are top end views, respectively, of the parts shown in FIGS. 13–16.

The improved conveyor generally indicated at 1 has a support platform 2 which has an inverted channel-shape indicated generally at 3 in FIGS. 5 to 12. Platform 2 has a flat top 4, downturned flanges 5 extending longitudinally of the top 4, and inturned flanges 6 which terminate upturned flanges 7. This structure provides rigidity and stability to the platform 2 which constitutes the base or main support member of the conveyor on which all the other components are mounted.

An upper belt roll 8 is mounted on platform 2 at the upper end of the platform, and a lower belt roll 9 is mounted on platform 2 at the lower end of the platform. An endless belt 10 is trained around rolls 8 and 9 and the upper run 11 of belt 10 (FIGS. 23-25) is supported on the flat top 4 while the lower run 12 of belt 10 moves below the flat top 4 and is spaced therefrom.

Belt 10 preferably is maintained centered in its movement along platform top 4 by an endless rib 13 formed on and projecting from the inner face of the belt 10 which moves along a corresponding groove 14 formed in platform top 4 and in central annular grooves 15 formed in the rolls 8 and 9. Flange members 16 are detachably connected to the side flanges 5 of platform 2 by quick release wing-nut and bolt means 17, and a bottom pan member 18, which is preferably channel-shaped, (FIGS. 19, 23-25) similarly is detachably connected to the platform side flanges 5 by quick-release wing-nut means 17.

Platform 2, side flanges 16, bottom pan 18 and rolls 8 and 9 preferably are formed of stainless steel or other similar material which can be cleaned easily to present sanitary conditions. A pair of guide brackets 19 is mounted exteriorly in spaced relation at the lower end of each downturned platform side flange 5. A channel-shaped strut member 20 is slidably mounted in each pair of guides 19 for adjustable movement longitudinally of platform 2. One end of each strut 20 is controlled by a toggle clamp 21 which moves strut 20 between retracted and extending positions longitudinally of platform 2, a retracted position being shown in FIGS. 5 and 6 and an extended position being shown in FIGS. 7, 8 and 21. Adjustment of the location of the extended position for tensioning the belt 10 is accomplished by the double adjustable nuts 22 which are threaded on the connecting member 23 of toggle clamp 21, the member 23 being retained assembled to strut 20 by a cotter pin 24.

The outer end of each strut 20 is notched at 25 forming a fork-like end (FIG. 5). An ear 26 projects from the strut 20 at the inner end of notch 25. The side edges 27 of notch 25 provide flanges on which bearing blocks 28 are slidably mounted in notches 25. The blocks 28 are formed with longitudinal grooves 29 (FIG. 29) which slidably engage the strut flanged edges 27, and the bearing blocks 28 when in place (FIGS. 6-8, 10-12) abut the ears 26.

Each block 28 is preferably formed of Teflon, Nylon or other low-friction material on which the lower roll 9 is journaled, roll 9 having projecting stub shafts 30 which are journaled within the openings 31 formed in the bearing blocks 28.

Figure 13:
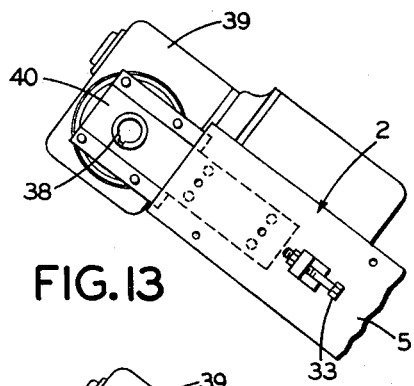
FIGS. 13, 14, 15 and 16 are views similar to FIGS. 5–8 of an upper portion of FIG. 3, illustrating steps in the reassembly.
Figure 14:
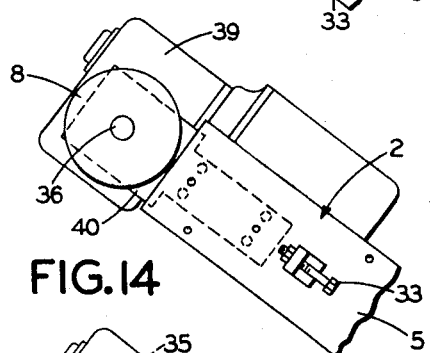
Figure 19:
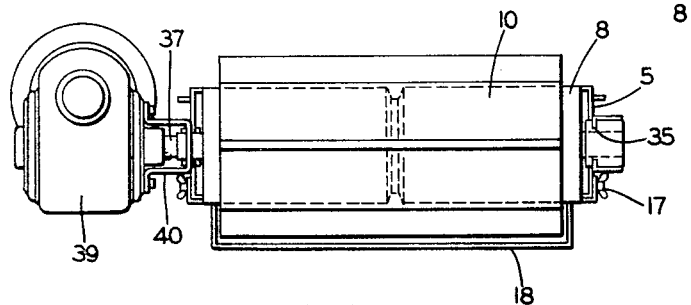
Figure 15:
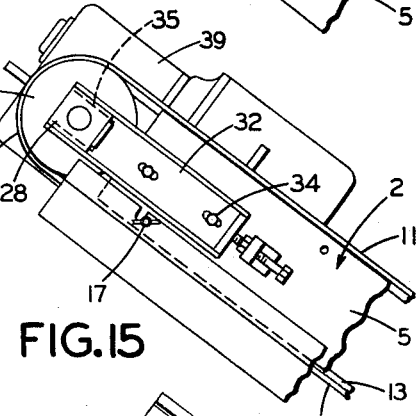
Figure 20:
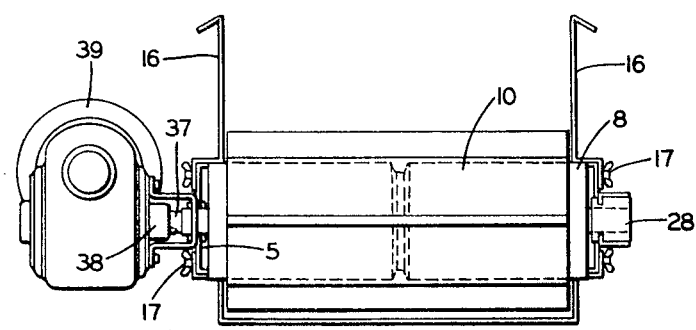
Figure 16:
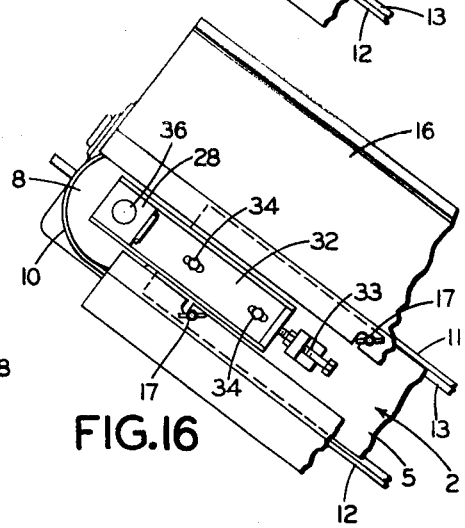

An upper strut 32 is adjustably mounted at the upper end on one side of platform side flange 5 as shown in FIG. 3 and FIGS. 13-20. The position of upper strut 32 is adjusted by adjustable stop bolt 33 and mounting bolts 34 (FIGS. 15 and 16). The outer end of strut 32 is formed with a notch 35 similar to the notch 25 in strut 20 in which a bearing block 28 is mounted journaling stub shaft 36 at one end of upper roll 8. The other end of roll 8 (FIG. 27) has an elongated spline shaft 37 which is received in the hollow output quill drive shaft 38 of drive unit 39 mounted by bracket 40 on the upper end of platform 2 (FIGS. 13-20).

The drive unit 39 may be of usual construction and includes an electric motor and a gear reduction operatively connected with the output quill 38.

The platform is supported in angular position by leg assemblies best shown in FIGS. 1-4. Each leg assembly supports the platform 2 cantilever-fashion. The lower leg support assembly generally indicated at 41 includes a cross member 42 and an adjustable upright member 43. Wheels 44 are journaled at the ends of cross member 42. The upper end of upright member 43 is fixed at 45 to a bracket 46 mounted on the lower end of one of the flanges 5 of platform 2.

The upper leg support assembly generally indicated at 47 has an adjustable vertical strut member 48 the upper end of which is pivotally mounted at 49 on the same flange 5 of platform 2 on which the lower leg support assembly is mounted (see FIGS. 1 and 2). Leg assembly 47 has a lower cross member 50 mounted on the lower end of strut 48. A brace 51 extends angularly from one end of member 50 to strut 48 (FIG. 2). An adjustable brace 52 is pivotally connected at 53 to flange 5 of support platform 2, and its free end is adjustably bolted at 54 to an upper end portion of strut 48 to maintain strut 48 in the desired angular position with respect to platform 2 so as to provide the desired angular position of the conveyor 1.

Belt 10, as shown, may have cross cleats 55 at spaced intervals on its outer surface to engage various types and kinds of meat products being conveyed. This is particularly important when conveying frozen meat in chipped condition since the frozen or icy meat chips may slide along the belt in the absence of cleats.

OPERATION AND USE

The conveyor in fully assembled and operating condition is well illustrated in FIGS. 1-4. Drive unit 39 is actuated to provide conveyor belt movement normally in the direction of the arrow 56 in FIG. 1. Although the conveyor is described primarily for handling various types and kinds of meat products, any type of food product can be handled on the conveyor 1.

At the end of a day or shift, when it is required by regulations that the conveyor must be fully cleaned, the quick release wing-nuts 17 are released, and side flange members 16 shown in FIGS. 16, 20, 21 and 22 are removed. Then pan 18 is released for removal by loosening wing-nuts 17, as illustrated in FIGS. 7 and 11. Then toggle clamp 21 may be moved from extended to the retracted position shown in FIG. 6, whereupon the belt 10 may be removed laterally from rolls 8 and 9 from the side of conveyor which is illustrated in FIG. 3, that is the left side of FIG. 4.

Figure 18:
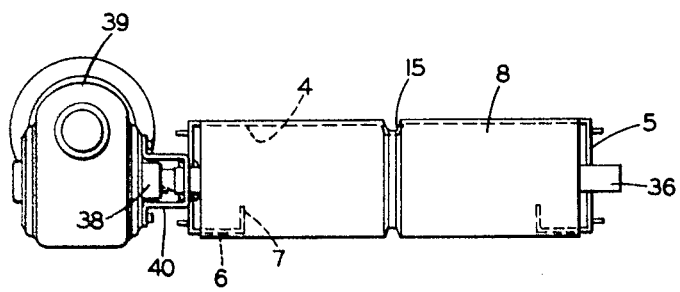

At this time lower roll 9 and its bearing blocks 28 may be slipped downwardly from the notches 25 in struts 20 so that the lower end of the platform 2 is as illustrated in FIGS. 5 and 9. Meanwhile block 28 at one end of the upper roll and upper strut 32 are removed by loosening mounting bolts 34 as shown in FIGS. 14 and 18 whereupon the upper roll may be removed endwise to the right of FIG. 18 from its spline connection with quill 38 so that the upper end of platform 2 is as shown in FIGS. 13 and 17.

The removed conveyor components then may be washed and cleaned with any desired or required cleaning solution and the platform 2, which is all that remains on the leg assemblies 41 and 47 may similarly be cleaned with water and cleaning solution sprays.

FIG. 26 illustrates a cross brace 57, three pairs of which may be mounted within platform 2 at spaced intervals as shown in FIGS. 23, 24, and 25. Brace 57 has notches 58 in its lower edge receiving the upturned flanges 7 of platform 2. It is preferred that two cross braces 57 be mounted at each of the locations shown in FIGS. 23 to 25, to securely brace the bracket mounting 46 for the lower leg assembly 41 and the pivotal connections 49 and 53 for the upper leg assembly and its adjusting brace. The lower edge 59 of brace 57 is spaced above the inturned flanges 6 (FIGS. 23-25) of platform 2 so that the entire inner surface of flanges 6 may be spray cleaned throughout the length of the platform.

The improved conveyor construction may be used in processing various food products and particularly meat products, providing for the delivery or transfer of meat products between various meat processing units; providing for complete and rapid dismantling of all conveyor components including a loop belt from the belt support platform; providing for movably mounting the belt support platform on legs with the platform extending angularly upward so that food products may be elevated by the driven conveyor belt; providing a construction which may have its components completely dismantled and cleaned and then rapidly reassembled in a short time period so as to reduce the cost and increase the efficiency of cleaning, while complying with government requirements regarding the use of food processing equipment; providing a construction which eliminates difficulties heretofore encountered in the use and cleaning of power driven belt food and meat products conveyors; providing a construction which achieves the stated objectives simply, effectively and inexpensively, and which solves problems and satisfies needs which have existed in the art; and providing, insofar as I am aware, the first food conveyor with a completely removable endless loop belt known in the art.

In the foregoing description certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details illustrated and described or to a food conveyor construction to be used solely for handling meat products.

Having now described the features, discoveries and principles of the invention, a preferred arrangement of the removable components of a food conveyor, the characteristics of the new construction and its use, and the advantageous, new and useful results obtained; the new and useful combinations, parts, elements, arrangements, relationships and constructions are set forth in the appended claims.

I claim:

1. In food conveyor construction, a support platform having an inverted channel-shape; the platform having a generally flat top with side edges, and first and second longitudinal side flange means extending downwardly and inwardly of said side edges; belt rolls at the ends of the platform; means removably mounting the rolls on the platform; adjustable means for retracting at least one of the rolls toward the other; pan means extending in spaced relation below the platform; first and second trough-forming flange means extending upwardly and longitudinally of the platform at the side edges thereof; quick-release means removably mounting the pan means and trough-forming flange means on the platform side flange means; an endless loop belt looped around the rolls with one run extending along and supported by the flat platform top between the trough-forming flange means; and with the other run extending below the platform top between the flat top and pan means; power drive means for the belt mounted on the platform, releasably engaging one of the rolls; and leg support means mounting the platform in cantilever-fashion including at least front and rear upwardly extending members, said members being connected to the platform first longitudinal side flange means whereby said belt means can be completely removed from the conveyor by laterally moving the belt means beyond the second side flange means after removal of the second trough-forming flange means and the pan means and after retracting one of said rolls to release the tension in said belt.

2. The construction defined in claim 1 in which the leg support members each have vertical strut means; in which one of the strut means is pivotally adjustably connected to said first plat-form side flange means; and in which at least one of the strut means is longitudinally adjustable in length.

3. The construction defined in claim 2 in which each leg member has spaced rollers mounted thereon stably to support the platform.

4. The construction defined in claim 2 in which a brace is pivotally connected at one end to the platform first side flange means, and is adjustably connected at its other end to pivotally connected vertical strut means.

5. The construction defined in claim 4 in which cross brace means is connected within the platform channel to the platform side flange means adjacent the pivotal strut and brace connections.

6. The construction defined in claim 1 in which the removable mounting of the rolls on the platform includes notch means formed in struts movably mounted on certain of the ends of the platform side flange means, bearing blocks slidably removably mounted in said notch means, and roll stub shafts removably journaled in said bearing blocks.

7. The construction defined in claim 6 in which the power drive means includes a quill, and in which one of the rolls has a releasable spline connection with said quill.

* * * * *